Aug. 8, 1939.　　　　E. J. LEARY　　　　2,168,906
LIFTING DEVICE
Filed May 18, 1937　　　2 Sheets-Sheet 1

Inventor
Edward J. Leary
By:- Cox & Moore attys

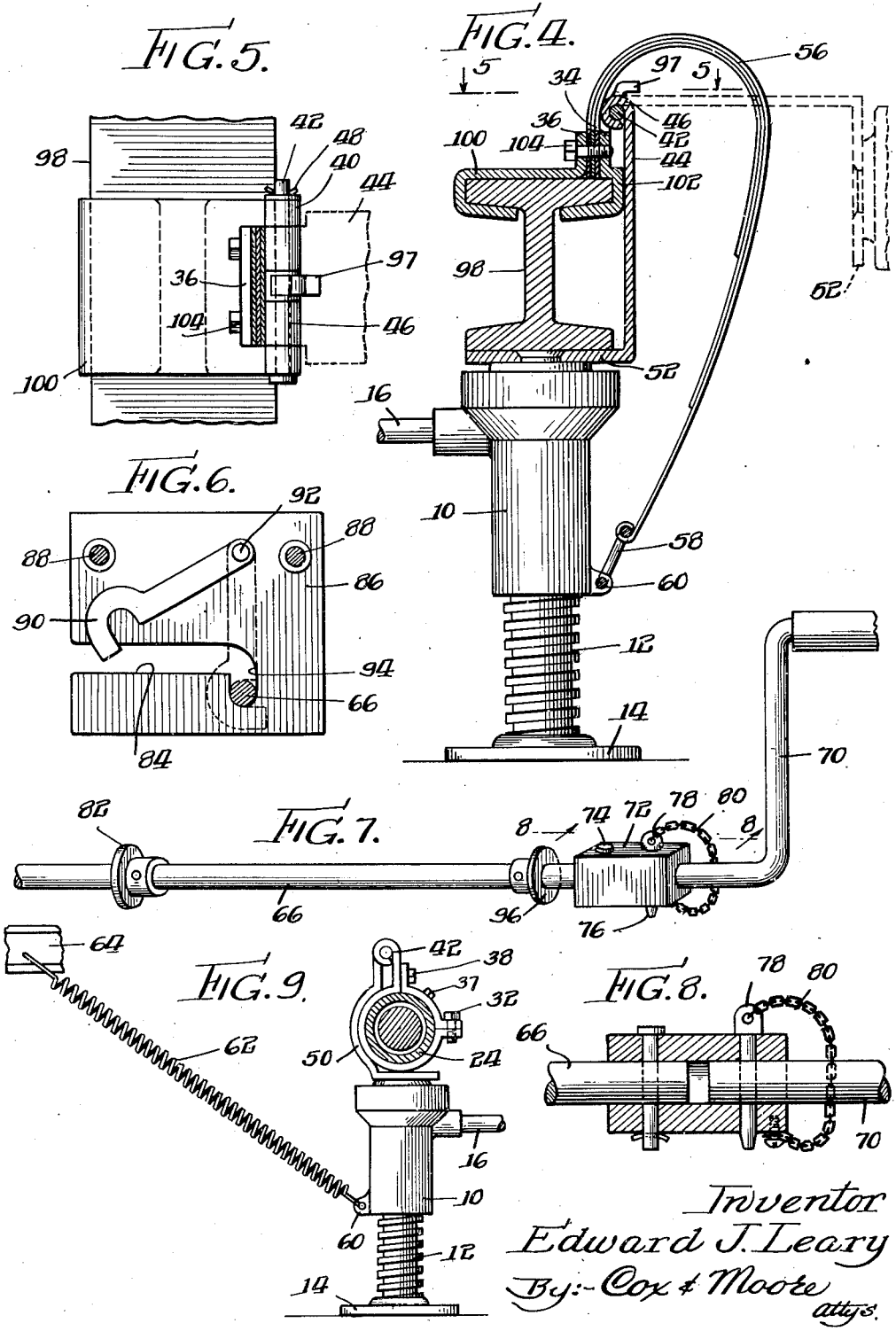

Patented Aug. 8, 1939

2,168,906

UNITED STATES PATENT OFFICE 2,168,906

LIFTING DEVICE

Edward J. Leary, Chicago, Ill.

Application May 18, 1937, Serial No. 143,335

14 Claims. (Cl. 254—86)

The present invention relates to a jack structure, and more particularly to an organization wherein one or more jacks is attached permanently to the frame or equivalent part of a vehicle.

It is an object of this invention to provide a jack normally forming a fixture upon the vehicle, which may be actuated remotely from the exterior thereof, and which is normally carried in retracted position but may be readily situated in operative position without immediate contact or positioning by the operator.

An additional object of this invention is to provide a jack accessory which can be readily secured in semi-permanent relationship to a vehicle and which is actuable from some readily accessible position to bring the jack into operative position and to elevate the jack.

A further object of this invention is to provide a jack forming a relatively permanent part of a vehicle which may be situated in lifting position by mere axial movement of a control bar, and which may be further actuated to raise the vehicle by further movement of the same control bar.

Yet another object of this invention is to provide a jack normally a part of a vehicle which is pivoted to move from vertical position where it can be actuated to lift the vehicle, to a horizontal position in the chassis and away from the roadbed.

Another object of this invention is to provide a jack pivoted to an axle or some equivalent portion of a vehicle to be moved selectively to retracted and operative positions, wherein in operative position the jack is positively situated under the axle to directly support the same, and more specifically to provide means for automatically positioning the jack by remote control.

A further object of this invention is to provide in a vehicle jack normally held upward and away from the roadbed, by resilient means, actuating means for locating the jack in operative position wherein relative movement of the parts will permit elevation of the vehicle, and to provide latch means to maintain the parts in relative position.

Numerous other objects and advantages will more fully appear during the cource and progress of the following specification.

Fig. 4 is an elevational view showing an alternative type of jack, suitable for attachment to the front axle of an automobile and the like;

Fig. 5 is a detail plan view taken on the line 5—5 in Fig. 4;

Fig. 6 is a detail elevation taken on the line 6—6 in Fig. 3;

Fig. 7 is a detail perspective view showing the control bar and handle;

Fig. 8 is a detail sectional elevation taken on the line 8—8 in Fig. 7; and

Fig. 9 is an elevational view of an alternative type of jack constructed in accordance with the present invention.

Figure 1:
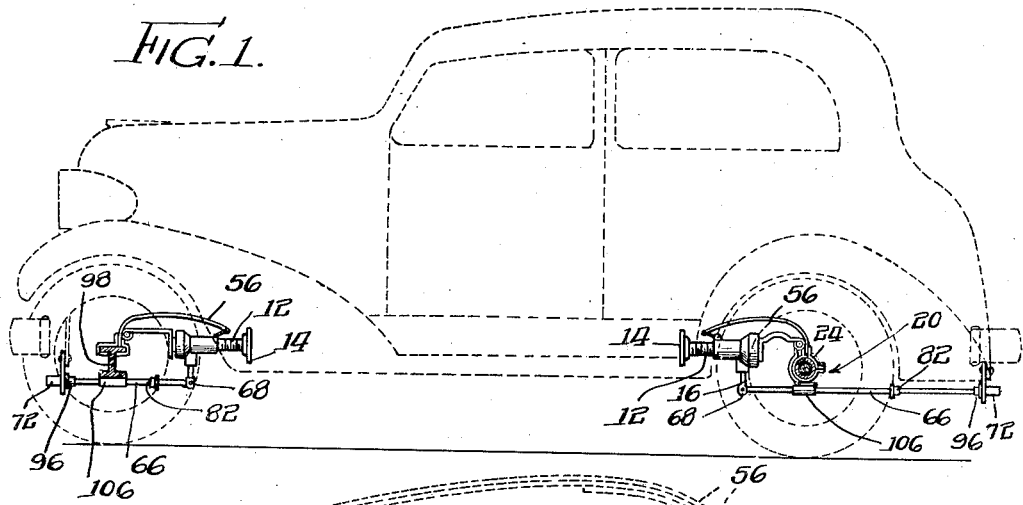
Fig. 1 is an elevation indicating the arrangement of jacks, in accordance with the present invention.

The present invention provides a jack construction which may normally be associated with any vehicle to raise the same from the ground for repairs, and is particularly adaptable to automotive vehicles for effecting tire repairs, and the like. The particular form shown in the drawings comprises means for attachment to the axles of an automotive vehicle, but it will be readily apparent that the devices may be associated with any other specific portion of the vehicle, in accordance with the desire of the user, or the specific purpose for which the vehicle is to be elevated.

Figure 2:
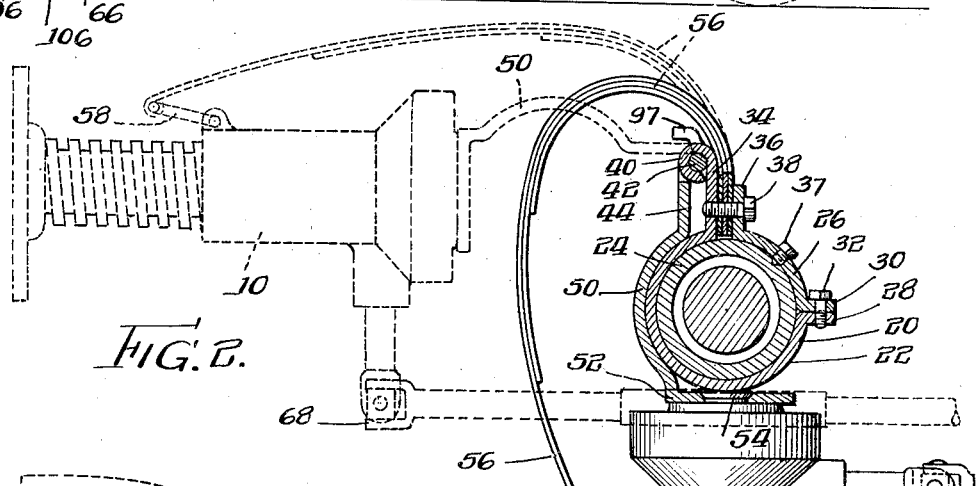
Fig. 2 is an elevational detail view of a jack constructed in accordance with the present invention, as applied to the axle of a vehicle.

The jack shown more in detail in Fig. 2 is of the screw type and comprises a body portion 10, having projecting therefrom a threaded column 12 with an integral base portion 14. A control arm 16 is fixed to the jack and connected with suitable gearing and an internal nut (not shown), whereby upon rotation of the control arm the column 12 will move axially with respect to the body portion 10 in a known manner for the purpose of elevating and lowering the vehicle.

Means is provided for more or less permanently fixing the jack to the vehicle and comprises a bracket 20 formed of a strap of metal 22, bent to a circular form in order to accommodate a substantial portion of the axle of the vehicle, indicated by the numeral 24, and conforming to, as shown in the figures, some three-quarters of the circumference of the axle. A second curved strap 26 of generally quadrantal extent completes the encompassing of the axle, except for a short intermediate portion which will be hereinafter described. The strap portion 22 is formed with a horizontally extending lower flange 28 in operative position registering with a corresponding flange 30 on the quadrantal strap 26, and secured together by machine screws 32, or any other suitable fastening means. Similar opposed flanges 34 and 36 at the upper side of the bracket or clamping strap are secured together in the same manner by machine screws or bolts 38. It will be apparent, therefore, that the bracket assembly 20 may be rigidly affixed to any suitable sized axle by springing the larger strap 22 over the axle and fastening the quadrantal strap member 26 securely in position to clampingly engage the axle. The bracket 20 is further rigidly associated with the axle against rotational or longitudinal movement by one or more set screws 37 threadedly positioned on the strap member 26, having hardened pointed ends adapted to engage into the surface of the axle, or into suitable indentations previously formed therein.

The flange 34 extends upwardly and terminates in a series of bent-over hinge tongues 40 encompassing and positioning a pivot pin 42. A jack-supporting arm 44 is provided at its upper end, as shown in Fig. 2, with a complementary hinge tongue loosely bent over the intermediate free portions of the pivot pin 42, whereby the jack-supporting arm is freely pivotal about the pin 42 as a center. Preferably, as indicated in Fig. 5, the pivot pin 42 is maintained in position in the hinge member by a head 46 and split pin 48.

The jack is rigidly secured to the arm 44 and arranged therewith so as, in operative position, to reside directly beneath the axle whereby to support the load directly upon its axis. This means comprises a curved offset portion 50, preferably bent to conform to the outer configuration of the strap 22 and terminating in a horizontally extending portion 52, directly beneath the axle. The horizontally extending portion is secured rigidly to the jack through the agency of a pin 54 integrally formed in the top surface of the jack and up-set in a corresponding beveled aperture in the horizontal extension 52. Thus, the jack may be moved freely about the pivot pin 42 in a clockwise direction to the position indicated by the dotted lines in Fig. 2, or by the solid lines in Fig. 1. In the former position the jack will reside upwardly against the chassis of the vehicle and completely away from the roadway or any obstructions formed thereon. By positioning the relative parts in accordance with the preferred embodiment shown in Figs. 1 and 2, the jack, in its uppermost or retracted position is protected from road obstructions by the axles.

In order to normally maintain the jack in retracted position there is provided a leaf spring 56 secured at one end to the body 10 of the jack by shackle means 58 pivoted to an integral lug 60 projecting from the body portion 10 of the jack. The inner end of the spring is rigidly clamped between the upstanding flanges 34 and 36. In accordance with the preferred embodiment the leaf spring is originally formed and heat-treated so as to possess a normal configuration somewhat as indicated by the dotted lines in Fig. 2. Thus, when the jack is in the position indicated by the solid lines in Fig. 2, the spring 56 will normally be under tension and will tend to draw the jack into retracted position. While the spring 56 forms a preferred embodiment, in accordance with the invention, any suitable means may be provided for resiliently drawing the assembly away from operative position when not in use, such, for instance, as the coil spring 62, as shown in Fig. 9, secured at one end to the lug 60 and at the other to a suitable portion of the frame of the vehicle 64.

The jack is remotely controllable for selective positioning in operative relationship to the axle 24 by means of a control rod 66 pivoted to the control arm 16 at the point 68. The pivot member comprises a universal joint or merely a pivot operable in a plane transverse to the plane of the axle, since it has been found that the parts disclosed possess the necessary resiliency to permit operation in the manner to be hereinafter described. The control rod 66 is movable axially as well as in a rotational direction by the crank arm 70, removably associated therewith through the agency of the connecting block 72 rigidly pinned as at 74 to the rod 66. A pin 76 having a head 78 and secured to the block by a chain 80 may be loosely situated in an aligned aperture through the block and crank to positively associate the crank with the control rod 66 on occasion when the jack is placed in use, but may be removed and stored in the vehicle during intermediate periods.

Figure 3:
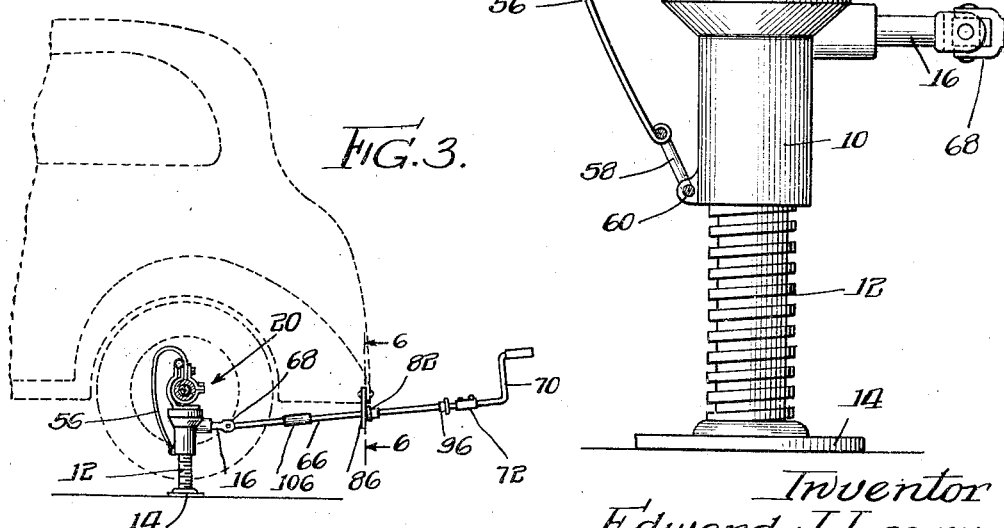
Fig. 3 is a view the same as Fig. 2, indicating the manner of operation to raise the rear axle of a vehicle.

In use, the jack is drawn downward into the positions indicated in Figs. 2, 3, 4 and 9 by an axial pull upon the crank 70 and the control rod 66. A collar 82 is rigidly pinned to the control bar 66 and cooperates with the horizontally extending slot 84 in the stop plate 86 to maintain the jack in this position against the action of the spring 56. The stop plate 86 is rigidly secured to the frame or body of the vehicle, as shown, by means of the bolts 88. A latch 90, having the general shape of a hook, is pivoted as at 92 above the downwardly projecting end portion 94 of the slot 84. When the control rod 66 is situated at the end 94 of the slot, as shown in Fig. 6, with the collar 82 adjacent the outer face of the stop plate, as indicated in Fig. 3, the hook-like latch 90 will engage it in the dotted line position and effectively prevent accidental withdrawal or dislocation therefrom in any direction. On the other hand, the rod 66 may be easily removed if the latch 90 is first pivoted manually to the full line position.

A second collar 96, spaced from the first collar and similarly pinned to the rod 66, is positioned to bear against the inner surface of the stop plate 86 when the jack is in retracted position for the purpose of fixedly positioning the parts and preventing rattling. This arrangement will be preferable where the spring 56 lacks a sufficient elasticity to fully maintain the jack in the dotted line position. In the preferred embodiment, however, horizontally projecting lugs 97 are welded or otherwise secured to the curved tongues 40 of the hinge and are arranged to contact the arm 44 when in its upward dotted line position, as shown in Fig. 2, and prevent further movement thereof. According to this arrangement the parts are tensioned between the lug 97 and the collar 96 when not in use. However, where the spring 56 is of such nature as to exert a considerable excess of elastic force in the said dotted line position, then the stop lug 97 may be omitted and the collar 96 normally positioned to reside adjacent the exterior face of the stop plate 86. It will be obvious from the above disclosure that one of the purposes of the collar 96 is to tension the various elements when not in use and prevent undue vibration thereof.

In operation, the jack, constructed in accordance with the present invention, may be clamped to the axle of a vehicle by placing the metal strap portions 22 and 26 about the axle and securing them rigidly thereto and to the spring 56 through the agency of the screws 32, 37 and 38. The rod 66 will normally extend rearwardly, as viewed in the rear axle assembly shown for the purpose of illustration in Fig. 1, although it will be obvious that the device may be actuated transversely of the vehicle or in any other suitable way, in accordance with the desire of the designer. In this position the rod 66 will normally be supported at its outer end in the portion 94 of the slot 84 in the stop plate 86, and held therein by the latch 90 against displacement. The action of the spring 56 and/or the action of the collar 96 against the stop plate 86, as hereinbefore mentioned, will maintain the jack and its associated supporting arm in upper retracted position. When it is desired to use the jack for effecting an elevation of the axle, as for instance in making a tire repair, the crank 70 is connected to the block 72 by means of the pin 76. After first moving the bar 66 sideways out of the slot 84, force is applied axially to draw the crank and the associated mechanism toward the operator, whereupon the jack will be pulled downwardly against the action of the spring 56 to the full line position, as indicated in Fig. 2. At this point the control rod 66 is reinserted in the slot 84 and positioned at the downwardly projecting portion 94 with the collar 82 on the outer surface of the stop plate 86. Movement of the latch 90, as hereinbefore mentioned, will maintain the parts fixedly in operative position.

It is to be noted that during movement of the jack to the vertical position the pivot connection has been caused to straighten so that in the final position the control arm 16 is in substantial alignment with the control bar 66. In this position it is merely necessary for the operator to rotate the crank 70 in order to transmit rotational movement to the arm 16 for the purpose of projecting the column 12 and its associated pedestal 14 downwardly for raising the vehicle with respect to the roadbed. After the repair has been effected, it is merely necessary to rotate the crank 70 in the opposite direction until the vehicle has been lowered and then in a reverse manner from the above to disassociate the bar 66 from the stop plate 86, permitting spring 55 to raise the jack into retracted position. At this time the bar 66 may again be associated with the stop plate, and the crank 70 be removed.

While the invention has been described as applied, specifically to the rear axle of an automotive vehicle, it may be equally as well adapted to the front portions of the vehicle and Figs. 1, 4 and 5 illustrate a form of the invention designed for association with the conventional I section type of axle 98. According to this preferred embodiment the pivot arm 44 likewise terminates in the horizontally extending portion 52, rigidly pinned to the jack, and is pivotal about the pivot 42 supported by the flange 34. The flange 34 and the spring 56 are secured with relation to the axle 98 by means of the opposed clamping portions 100 and 102 extending oppositely about and engaging the upper web of the I-shaped axle, as shown in Fig. 4, and fastened securely together by machine screws or bolts 104 passing through the end of the spring 56. Since the pivot 42 is positioned adjacent the vertical rearward edge of the axle, the arm 44 and the jack will be freely pivotal thereabout, to a position indicated in part by the dotted lines in Fig. 4 and the full lines in Figs. 1 and 5. The control means for actuating the jack may be identical with those described in connection with the previous embodiment.

As indicated in more detail in Fig. 1, a plurality of these accessories may be associated with each end of both axles so that any wheel or its associated mechanism may be individually elevated from the roadbed. On the other hand, two individual jacks may be situated to elevate either end of the vehicle. Alternatively the jacks may be situated in any position with regard to the vehicle desired by the operator, for the purpose of selectively elevating any part thereof, or a single unit, properly located, may be employed singly to lift the vehicle by itself. Moreover, the present invention may be used not only for elevating devices of the kind specifically disclosed for illustrative purposes, but may be associated with any device wherein elevational displacement is sometimes necessary. So, also, it will not be necessary to clamp the device to the axles since it may, in accordance with the present invention, be fixed to the chassis or any other suitable part of the device which is to be elevated.

The present invention provides means for readily and quickly locating a jack in operating position, and elevating the jack from a remote point without difficulty to the operator. It is to be noted that the jack is automatically positioned properly with respect to the portion of the device which is directly lifted, and that no portion of this positioning step is left to the skill of the operator. Thus, when the bar 66 is actuated to pull the jack in counter-clockwise direction, this arcuate movement is limited by contact of the curved portion 50 of the pivoted arm with the corresponding edge of the strap 22, as shown in Fig. 2. When the parts reach this relationship, the jack will be inevitably situated in proper relationship with respect to the axle 24 and substantially directly therebelow in order to carry the weight of the axle and the vehicle directly on its upper surface. So, too, in this position, the lifting force will not be transmitted to any substantial extent to the arm 44 and the pivot 42. On the other hand, the clamping strap 22, supporting the axle, will reside directly upon the horizontal portion 52 of the arm 44 and the top surface of the pin 54 when the vehicle is supported by the jack. The same is true of the preferred embodiment, shown in Fig. 4.

A suitable resilient cushioning sleeve 106, which may comprise a length of rubber tube or the like, is positioned along the bar 66 and situated to underlie the axle when the jack is in retracted position. This element will serve to cushion contact therewith and eliminate undue metallic noises or vibration.

The present invention provides a simple method for raising a vehicle which is particularly useful in muddy terrain, in the vicinity of snowbanks and the like, and regardless of road conditions. It is extremely economical in cost and renders tire changing and the like possible in the case of women, aged people, and those physically impaired. In addition, it eliminates danger of personal injury or soiled apparel incident to the normal elevation of a vehicle, and eliminates the difficulty of properly placing a jack under a car in darkness or bad weather. All of these valuable effects are obtained with a jack having a relatively short vertical path of movement and without any parts projecting unduly adjacent the roadbed in such a position as to be damaged by obstructions in the road.

Changes may be made in he form, construction and arrangement of the parts without departing from the spirit of the invention or sacrificing any of its advantages, and the right is hereby reserved to make all such changes as fairly fall within the scope of the following claims.

Having thus described my invention, what I claim as new and desire to secure by United States Letters Patent is as follows:

1. In combination with a vehicle, a jack, pivot means to support said jack in a relatively inaccessible position with respect to the vehicle for action selectively in operating or retracted position, retracting means normally urging said jack to retracted position, means extending from said jack to a relatively remote position with respect to said jack which relatively remote position is conveniently accessible to operate for moving said jack to operative position against said retracting means, and means to selectively hold said jack against retraction when in operative position.

2. In combination with a vehicle, a jack, pivot means to support said jack with respect to the vehicle for action selectively in operating or retracted position, means normally urging said jack to retracted position at all times, and means for moving said jack to operating position, said last named means being interengageable with the vehicle in operative position to maintain the jack in said operative position.

3. In combination with a vehicle, a jack pivoted to said vehicle for pivotal movement selectively to operating or retracted position, means resiliently urging the jack at all times to said retracted position, control bar means longitudinally shiftable to pivot said jack selectively about its pivot into operating or retracting position and extending to a relatively remote position convenient for manipulation by an operator, said control bar means being operative rotatably about its longitudinal axis to actuate said jack to raise the vehicle when the jack is in said operating position.

4. In combination with a vehicle, a jack pivoted to said vehicle, rotatable means to actuate said jack whereby to raise the vehicle when the jack is in operating position, link means pivotally connected to said rotatable means and longitudinally shiftable to selectively move the jack about its pivot to operating or retracted position, said longitudinally shiftable link means being in substantial alinement with said rotatable means when the jack is in operative position and said longitudinal shiftable means being rotatably mounted in said position whereby said longitudinally shiftable means is operative to rotate said rotatable means in said operating position to raise the vehicle.

5. In combination with a vehicle, a jack secured to said vehicle and adapted for movement to operating or retracted position, a control bar bodily shiftable to move the jack selectively to either of said positions, and means on the vehicle to engage the bar against said shiftable movement to maintain the jack in said operating position.

6. In combination with a vehicle, a jack secured to said vehicle and adapted for movement to operating or retracted position, a control bar to move the jack selectively to either of said positions, slotted means on the vehicle engageable with cooperating means on the bar to maintain the jack in said operating position with respect to the vehicle, and latch means to maintain said bar in said engaging means.

7. In combination with a vehicle, a jack secured to said vehicle and adapted for movement to operating or retracted position, a control bar bodily shiftable to move the jack selectively to either of said positions, slotted means on the vehicle engageable with cooperating means on the bar to maintain the jack in said operating position with respect to the vehicle, and a hook actuable across said slot to maintain the bar in engagement therewith.

8. In combination with a vehicle having an axle, a jack, a pivot rigidly secured to the axle and at an elevated position with respect thereto, supporting means connecting the jack with the pivot for movement in an arcuate path with respect to the axle whereby the jack may be selectively situated in operative position or in retracted, generally horizontally projecting position, and leaf spring means to maintain the jack in retracted position, said leaf spring having one end fixed with respect to the axle and the other end pivotally connected to the jack.

9. In combination with a vehicle having an axle, a jack, a pivot rigidly secured to the axle, supporting means connecting the jack with the pivot for movement in an arcuate path with respect to the axle whereby the jack may be selectively situated in operative, generally downwardly projecting position or in retracted, generally horizontally projecting position, substantially adjacent the horizontal plane of the axle, a control arm projecting from the jack and arranged generally in the plane of said arcuate path, and a control link associated with said arm and longitudinally shiftable to move the jack to one of said positions, said control link being pivoted to said arm about an axis generally transverse to said plane, said control link being supported on the vehicle at a point relatively remote from the jack and having means adjacent its end to permit longitudinally shiftable actuation for bringing the jack into operative position.

10. In combination with a vehicle, a jack pivoted to said vehicle, spring means to maintain the jack in upward retracted position away from the roadway, manual means to lower said jack about the pivot to operative position, and means operable to selectively maintain said parts in said operative position against movement about the pivot when the jack is in use.

11. In combination with a vehicle, a jack pivoted to said vehicle, spring means to maintain the jack in upward retracted position away from the roadway, manually controllable means to lower said jack about the pivot to operative position, and means on said vehicle to engage the manual means to maintain the parts in said operative position against movement about the pivot.

12. In a device of the class described, a clamp adapted to be affixed to the axle of a vehicle, a pivot on said clamp adjacent the upper portion thereof, a jack mounted on said pivot for movement in a limited arcuate path with respect to the clamp, the jack in one limiting arcuate position residing in predetermined supporting position directly beneath the axle and in direct supporting relationship thereto.

13. In a device of the class described, a pivot mounted rigidly with respect to the axle of a vehicle, an arm mounted on the pivot and having a portion adapted in one limiting pivotal position to underlie the axle of a vehicle in direct supporting relationship, a jack secured to said underlying portion, said jack being in operative position when the arm portion and the jack reside directly beneath the axle, and means remotely operable to automatically locate the jack in said predetermined operative position when said jack is actuated to said operative position.

14. In combination with a vehicle having an axle, a jack, pivot means securing said jack to the vehicle and at an elevated position with respect to the axle, said jack being movable in an arcuate path about said pivot from a retracted generally horizontally projected position to operative vertically extending position adjacent the axle, and leaf spring means having one end fixedly secured to the vehicle in generally upwardly extending position, the other end being connected to said jack at a point remote from said pivot and being pivotally secured to said jack at said remote point.

EDWARD J. LEARY.